United States Patent
Baek

(10) Patent No.: US 7,602,854 B2
(45) Date of Patent: Oct. 13, 2009

(54) METHOD OF RECEIVING OF OFDM SIGNAL HAVING REPETITIVE PREAMBLE SIGNAL

(75) Inventor: Seung-Kwon Baek, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 697 days.

(21) Appl. No.: 11/335,956

(22) Filed: Jan. 19, 2006

(65) Prior Publication Data
US 2007/0030797 A1 Feb. 8, 2007

(30) Foreign Application Priority Data
Jan. 26, 2005 (KR) .................... 10-2005-0007223

(51) Int. Cl.
*H04K 1/10* (2006.01)
*H04L 27/06* (2006.01)
(52) U.S. Cl. ...................... 375/260; 375/343
(58) Field of Classification Search ............. 375/260, 375/343
See application file for complete search history.

(56) References Cited

U.S. PATENT DOCUMENTS

| 7,266,164 | B2 * | 9/2007 | Jeon et al. ............ 375/340 |
| 2002/0126220 | A1 * | 9/2002 | Wilson et al. ........... 348/518 |
| 2006/0239370 | A1 * | 10/2006 | Mody et al. ............ 375/260 |

FOREIGN PATENT DOCUMENTS

| JP | 10-294711 | 11/1998 |
| KR | 2001-0105898 | 11/2001 |
| KR | 2002-0089793 | 11/2002 |
| KR | 2004-0024987 | 3/2004 |

OTHER PUBLICATIONS

English language abstract of Korean Publication No. 2001-0105898.
English language abstract of Korean Publication No. 2002-0089793.
English language abstract of Korean Publication No. 2004-0024987.
English language abstract of Japanese Publication No. 10-294711.

* cited by examiner

*Primary Examiner*—Don N Vo
(74) *Attorney, Agent, or Firm*—Marger Johnson & McCollom, P.C.

(57) ABSTRACT

A method of receiving an orthogonal frequency division multiplexing (OFDM) signal. The method includes receiving sample signals from the OFDM signal, providing reference sample signals, calculating a first value representing a first correlation between the sample signals and different sample signals, calculating a second value representing a second correlation between the reference sample signals and different reference sample signals, the reference sample signals and the different reference sample signals corresponding to the sample signals and the different sample signals, calculating a third value from the first value and the second value, and detecting the OFDM signal in response to the third value.

23 Claims, 5 Drawing Sheets

METHOD OF RECEIVING OF OFDM SIGNAL HAVING REPETITIVE PREAMBLE SIGNAL

BACKGROUND OF THE INVENTION

This application claims the benefit of Korean Patent Application No. 10-2005-0007223, filed on Jan. 26, 2005, in the Korean Intellectual Property Office, the disclosure of which is incorporated herein in its entirety by reference.

1. Field of the Invention

This application relates to methods of receiving an Orthogonal Frequency Division Multiplexing (OFDM) signal, and more particularly, to methods of receiving an OFDM signal having a repetitive preamble signal, detecting the OFDM signal and performing a signal synchronization.

2. Description of the Related Art

An Orthogonal Frequency Division Multiplexing (OFDM) method is widely used to transmit and receive data through a channel.

In the OFDM method, a preamble signal having a repetitive characteristic is transmitted as part of an OFDM signal. Signal synchronization is performed in a receiving end using the transmitted preamble signal.

Conventionally, the OFDM signal may be received using a level detection method using a delay correlation, or a matched point detection method using a matched filter.

However, the receiving end using the level detection method usually malfunctions due to a large change in a correlation value in an additive white gausian noise (AWGN) environment. In addition, the level detection method requires computation for a signal synchronization.

In the matched point detection method, a matched filter peak point cannot be detected due to an existence of a frequency offset.

SUMMARY OF THE INVENTION

Embodiments include a method of receiving an orthogonal frequency division multiplexing (OFDM) signal includes receiving sample signals from the OFDM signal, providing reference sample signals, calculating a first value representing a first correlation between the sample signals and different sample signals, calculating a second value representing a second correlation between the reference sample signals and different reference sample signals, the reference sample signals and the different reference sample signals corresponding to the sample signals and the different sample signals, calculating a third value from the first value and the second value, and detecting the OFDM signal in response to the third value.

BRIEF DESCRIPTION OF THE DRAWINGS

The above objects and advantages of the present invention will become more apparent by describing in detail exemplary embodiments thereof with reference to the attached drawings in which.

DETAILED DESCRIPTION OF THE INVENTION

Figure 1:
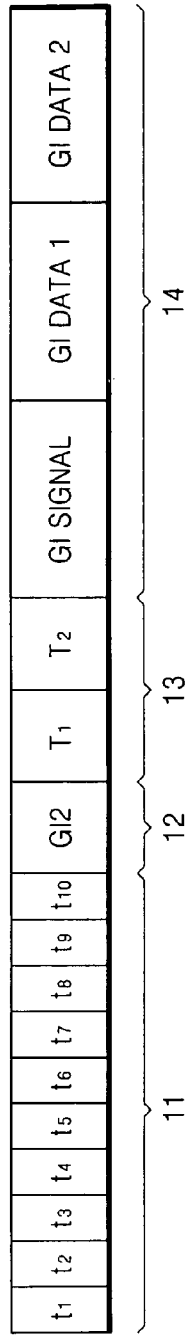
FIG. 1 illustrates a frame format of an Orthogonal Frequency Division Multiplexing (OFDM) signal.

The present invention will now be described more fully with reference to the accompanying drawings, in which exemplary embodiments of the invention are shown. Like reference numerals in the drawings denote like elements throughout the drawings.

FIG. 1 illustrates a frame format of an Orthogonal Frequency Division Multiplexing (OFDM) signal. Specifically, FIG. 1 illustrates an OFDM frame format 10 having a repetitive preamble characteristic used for a wireless local area network (LAN) communication based on IEEE 802.11x standards. Referring to FIG. 1, the OFDM frame format 10 consists of a short preamble field 11, a guard interval field 12, a long preamble field 13, and a valid data field 14.

Each of preamble symbols t1~t10 of the short preamble field 11 has sixteen (16) sample signals. Each of preamble symbols T1 and T2 of the long preamble field 13 has sixty-four (64) sample signals.

The short preamble field 11 having the repetitive preamble characteristic is used to detect and synchronize the OFDM signal.

An apparatus for receiving the OFMD signal checks whether the OFDM signal is received via a level detection method using a delay correlation, or a matched point detection method using a matched filter.

The delay relation method uses Equation 1 below $$\sum_{k=0}^{k=m-1} x_k x_{k-m}^* \quad (1)$$

wherein, $x_k$ is a $k^{th}$ sample signal in a current preamble symbol of the received OFDM signal, $x^*_{k-m}$ is a complex conjugate of a sample signal in a previous preamble symbol corresponding to the $x_k$ sample signal, and m is the number of samples in a preamble signal. For example, if k=3 and m=16, $x_3$ is a $3^{rd}$ sample signal in the current preamble symbol, and $x^*_{3-16}$ is a complex conjugate of a $3^{rd}$ sample signal in a previous preamble symbol.

Figure 2:
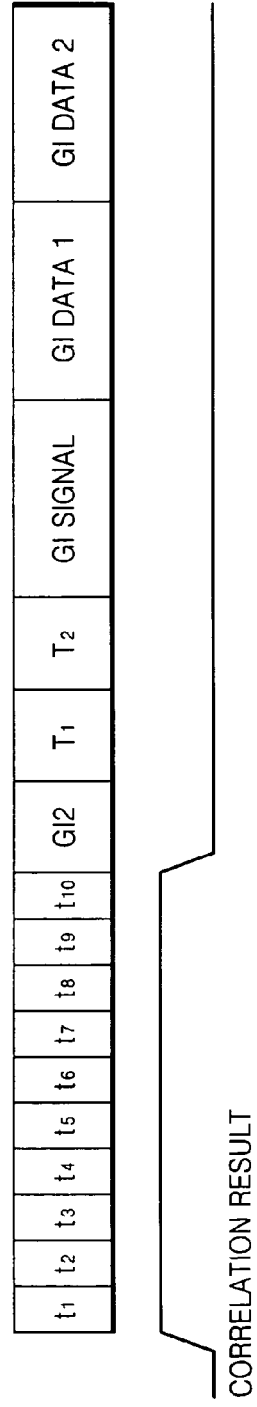
FIG. 2 illustrates the relationship between a correlation result using a delay correlation and the frame of the OFDM signal.

Values obtained by multiplying preamble sample signals in the current preamble symbol by corresponding complex conjugates of preamble sample signals in the previous preamble symbol are summed up, resulting in a correlation result shown in FIG. 2.

FIG. 2 illustrates the relationship between the correlation result using the delay correlation and the frame of the OFDM signal. Referring to FIG. 2, when the OFDM signal is received, a value of the correlation result is greater than a predetermined threshold value in the short preamble field and less than the predetermined threshold value in other fields.

Specifically, the level detection method using the delay correlation calculates a delay correlation value using Equation 1, compares the calculated delay correlation value with the predetermined threshold value, and determines whether the OFDM signal is received.

The method requires a relatively simple hardware structure having a small size, and partly shares computations with a frequency offset algorithm. However, the method requires an additional computation to perform signal synchronization and makes it difficult to properly determine the threshold value due to a great change in the correlation value in a degradation of a signal-to-noise ratio (SNR) margin, causing an erroneous detection of the OFDM signal.

The matched filter method uses Equation 2 below $$\sum_{k=0}^{k=m-1} x_k r_k^* \qquad (2)$$

wherein, $x_k$ is a $k^{th}$ sample signal in a preamble symbol in a receiving end, $r_k$ is a reference signal corresponding to the $x_k$ sample signal in a transmitting end, and m is the number of samples in a preamble signal.

Figure 3:
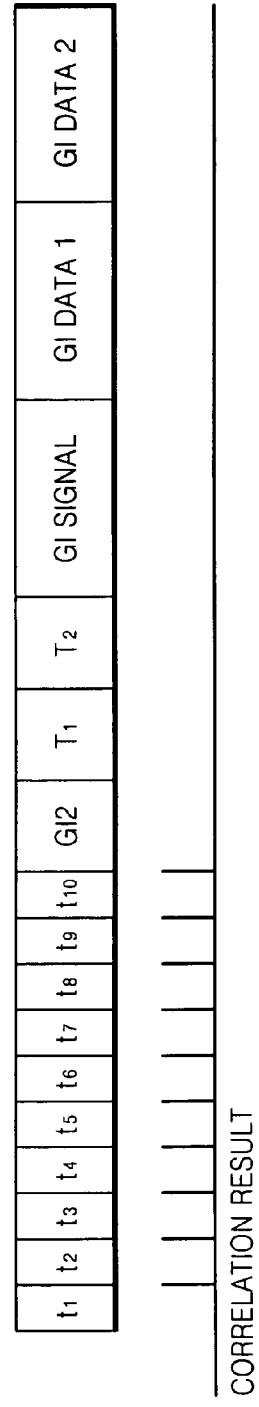
FIG. 3 illustrates the relationship between a correlation result using a matched filter method and the frame of the OFDM signal.

Values obtained by multiplying preamble sample signals by complex conjugates of reference signals corresponding to the preamble sample signals are summed up, resulting in a correlation result shown in FIG. 3.

FIG. 3 illustrates the relationship between a correlation result using the matched filter method and the frame of the OFDM signal. Referring to FIG. 3, when the OFDM signal is received, a value of the correlation result has a peak shape in the short preamble field. Specifically, the matched point detection method detects periodic peaks of the correlation result using Equation 2, detects the OFDM signal, and performs the signal synchronization.

Figure 4:
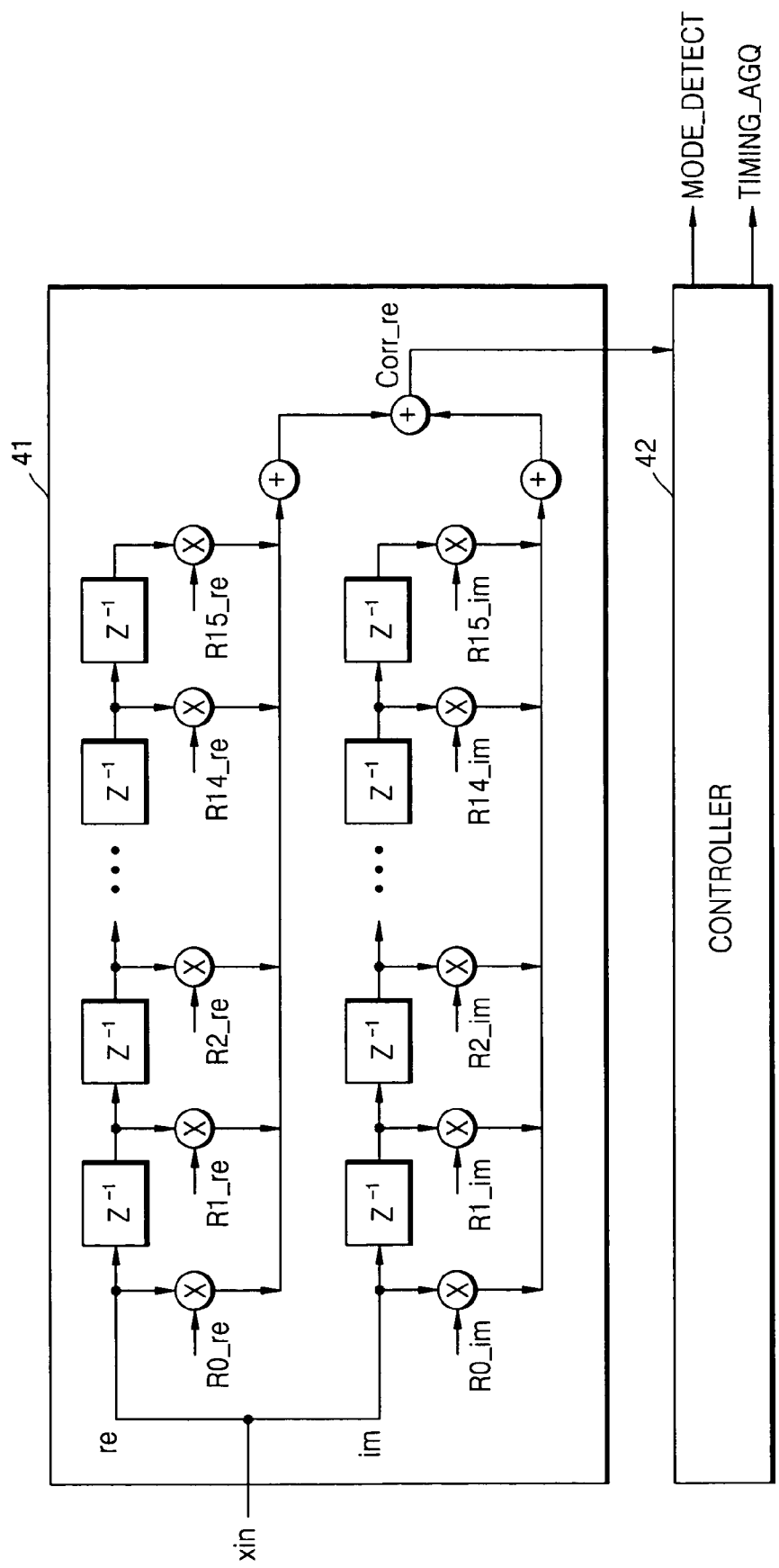
FIG. 4 is a block diagram illustrating an apparatus for receiving an OFDM signal using the matched filter method.

FIG. 4 is a block diagram illustrating an apparatus for receiving an OFDM signal using the matched filter method. Referring to FIG. 4, a computation unit 41 multiplies real number components and imaginary number components of a received preamble signal Xin by real number components R0_re through R15_re and imaginary number components R0_im through R15_im of each reference signal, sums up the multiplied values, and outputs a real number component Corr_re of the correlation result obtained by Equation 2. A controller 42 receives the real number component Corr_re and performs a detection of the OFDM signal Mode_detect and a signal synchronization Timing_acq.

Even though such a matched filter method must perform multiplication, it can stably perform the OFDM signal detection Mode_detect and the signal synchronization Timing_acq in an additive white gaussian noise (AWGN) environment. However, when the received preamble signal Xin includes a frequency offset, the periodic peaks of the correlation result shown in FIG. 3 disappear.

Differential correlation matching is calculated using Equation 3 below $$\sum_{k=0}^{k=m-1} x_k x_{k-1}^* r_k r_{k-1}^* \qquad (3)$$

wherein, $x_k$ is a $k^{th}$ sample signal of a received preamble signal, $x_{k-1}$ is a k-$1^{th}$ sample signal of the received preamble signal, $r_k$ is a $k^{th}$ sample signal of a reference signal, $r_{k-1}$ is a k-$1^{th}$ sample signal of the reference signal, m is the number of samples in the preamble signal in symbol units, and * denotes a complex conjugate.

The differential correlation matching is calculated by multiplying correlation values of the two adjacent reference signals $r_k$ and $r_{k-1}$ by correlation values of the input signals $x_k$ and $x_{k-1}$ and summing up the multiplied values.

For example, when the received preamble signal includes the frequency offset $\Delta\omega$ and phase offset $\Delta\theta$, $x_k = r_k e^{j\Delta\omega k}$ and, $x_{k-1} = r_{k-1} e^{j\Delta\theta}$. $\Delta\theta$ may denote a common phase noise at the beginning of a correlation computation.

Equation 4 is as follows.

$$\sum_{k=0}^{k=m-1} r_k e^{j\Delta\omega k} r_{k-1}^* e^{-j\Delta\omega k} e^{-j\Delta\theta} r_k r_{k-1}^* \qquad (4)$$

After canceling terms in Equation 5, the summed value is given by Equation 5, $$\sum_{k=0}^{k=m-1} r_k r_{k-1}^* r_k r_{k-1}^* e^{-j\Delta\theta} \qquad (5)$$

The real number component is separated from the result of Equation 5, and is given by Equation 6, $$\sum_{k=0}^{k=m-1} \left( \begin{array}{c} (r_{(k)re}r_{(k-1)re} + r_{(k)im}r_{(k-1)im})^2 - \\ (r_{(k)im}r_{(k-1)re} - r_{(k)re}r_{(k-1)im})^2 \end{array} \right) \cos\Delta\theta \qquad (6)$$

Figure 5:
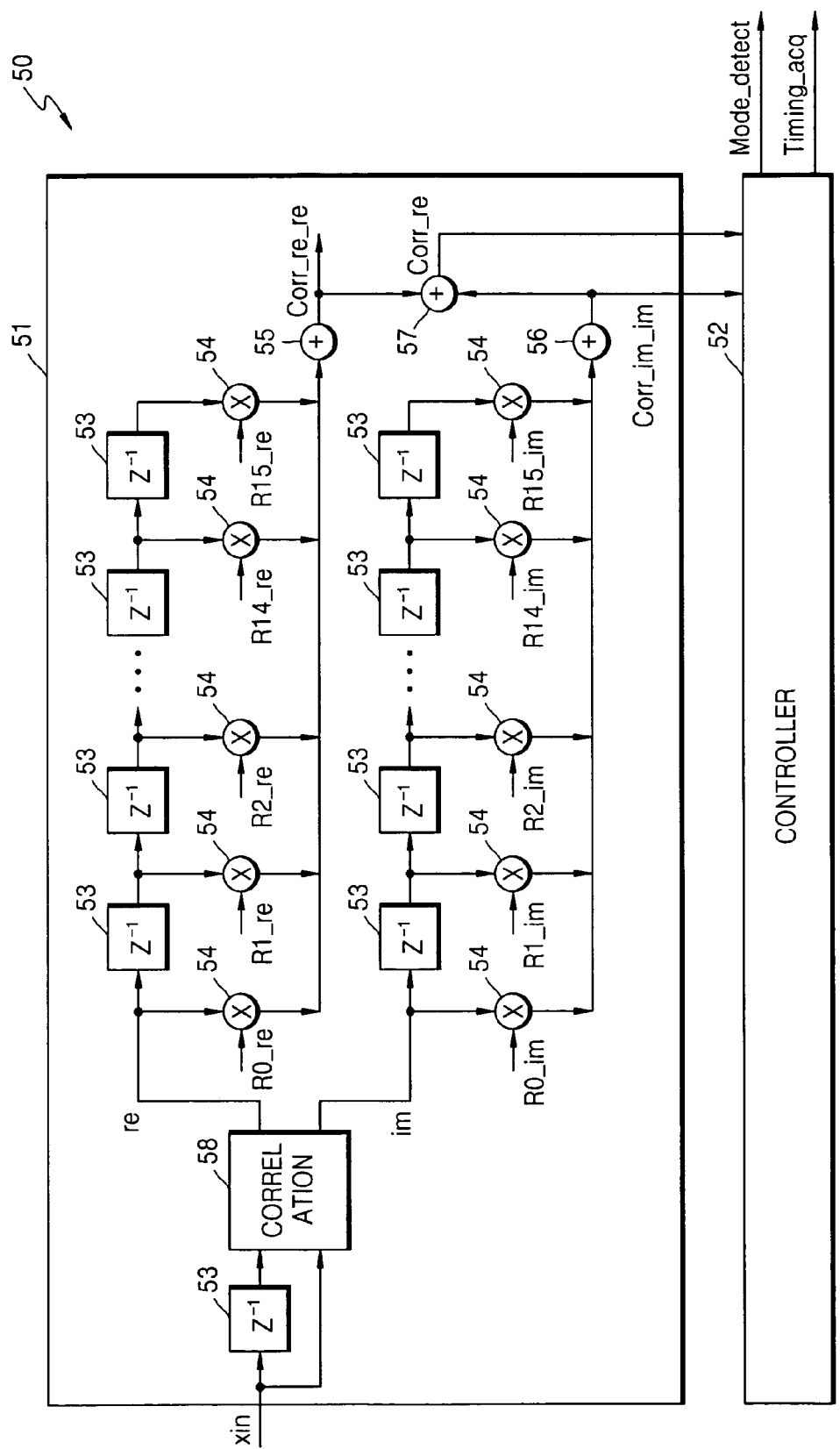
FIG. 5 is a block diagram illustrating an apparatus for receiving an OFDM signal according to an embodiment.

FIG. 5 illustrates the constitution of an apparatus 50 for receiving an OFDM signal according to an embodiment of the present invention. Referring to FIG. 5, the apparatus 50 for receiving the OFDM signal includes a computation unit 51 and a controller 52. The computation unit 51 receives the preamble signal Xin having a repetitive characteristic and obtains the computation results Corr_re using Equation 6. The controller 52 performs the detection of the OFDM signal Mode_detect and the signal synchronization Timing_acq using the apparatus 50 for receiving an OFDM signal.

The computation unit 51 includes delay units 53, multiplication units 54, summation units 55, 56 and 57, and a correlation computation unit 58. The multiplication units 54 multiply the preamble signal Xin by a reference signal. The first summation unit 55 calculates a first computation result Corr_re_re and the second summation unit 56 calculates a second computation result Corr_im_im. The third summation unit 57 sums up the first computation result Corr_re_re and the second computation result Corr_im_im and calculates a third computation result Corr_re. The third computation result Corr_re is given in Equation 6. The first computation result Corr_re_re and the second computation result Corr_im_im are given by Equations 7 and 8, respectively.

$$\sum_{k=0}^{k=m-1} (r_{(k)re}r_{(k-1)re} + r_{(k)im}r_{(k-1)im})^2 \cos\Delta\theta \qquad (7)$$

-continued $$\sum_{k=0}^{k=m-1} (r_{(k)im}r_{(k-1)re} - r_{(k)re}r_{(k-1)im})^2 \cos\Delta\theta \qquad (8)$$

In Equation 7, values obtained by multiplying the real number components and multiplying the imaginary number components of two adjacent signals in Equation 6 are summed up. In Equation 8, values obtained by multiplying the real number components and the imaginary number components of two adjacent signals in Equation 6 are summed up.

Figure 6:
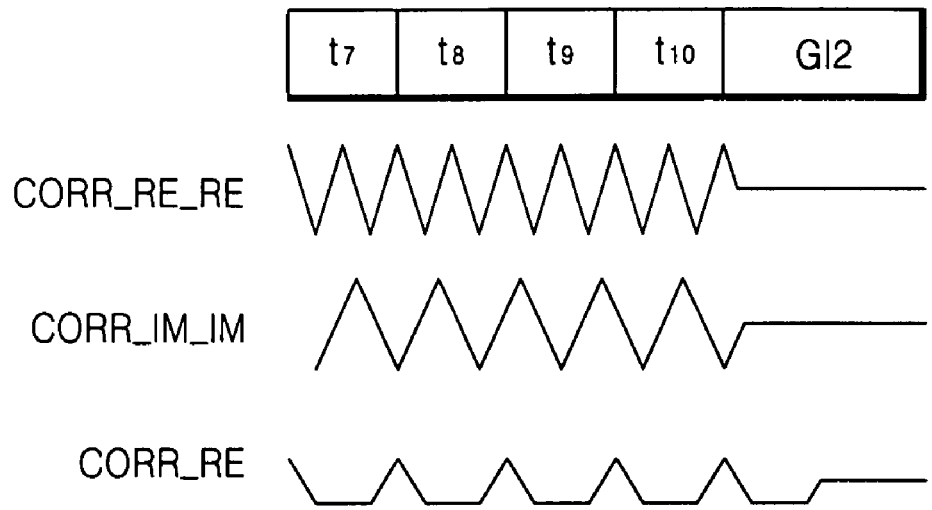
FIG. 6 illustrates the relationship between a correlation result using a differential correlation matching method according to an embodiment and the frame of the OFDM signal.

FIG. 6 illustrates the relationship between a correlation result using the differential correlation matching method and the frame of the OFDM signal. The differential correlation matching method may be used to generate peak points or lowest points in a waveform of the correlation result even though the preamble signal includes the frequency offset.

Referring to FIG. 6, the first computation result Cor_re_re, the second computation result _im _im, and the third computation result Corr_re are given in Equations 7, 8 and 6, respectively. The correlation result has peak points in the preamble field of the frame of the OFDM signal. The correlation between the preamble signal and the reference signal disappears during the guard interval field after the preamble field and accordingly the peak points disappear.

The method of receiving the OFDM signal detects and synchronizes the OFMD signal using the peak points shown in FIG. 6. For example, if the number of peak points of the second computation result Corr_im_im that match the lowest points of the third computation result Corr_re is greater than a predetermined threshold value, it is determined that the OFDM signal is received. Alternatively, if the number of peak points of the third computation result Corr_re is greater than a predetermined threshold value, it is determined that the OFDM signal is received.

Each of final peak points of the second and third computation results, _im _im and Corr_re, is used as a signal synchronization point to perform the signal synchronization. To detect and synchronize the OFDM signal, the waveform of the correlation result is divided into windows on the basis of the peak points.

Figure 7:
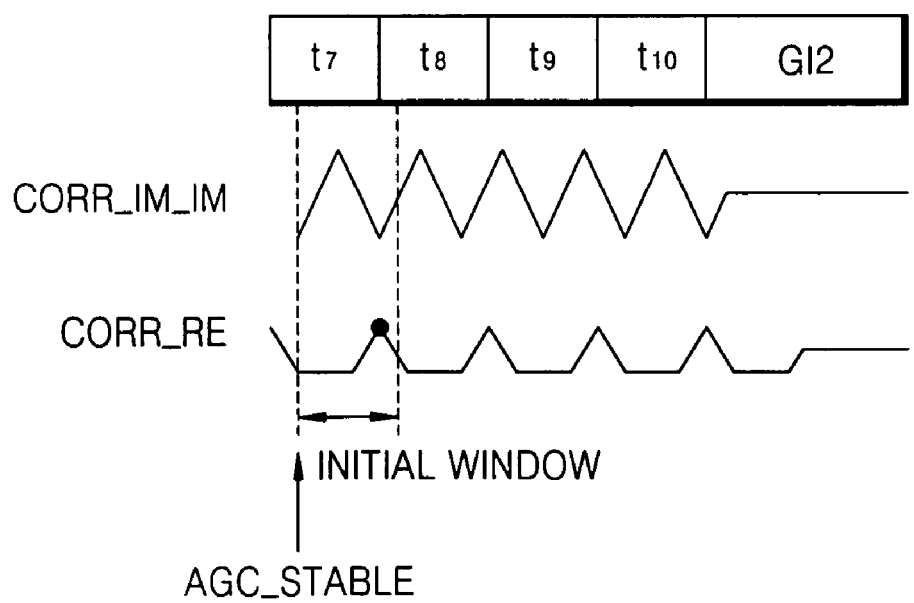
FIG. 7 illustrates an initial window field in a waveform of the correlation result according to an embodiment.

FIG. 7 illustrates an initial window field in the waveform of the correlation result according to an embodiment. Referring to FIG. 7, the initial window field in symbol units is established at a point having a stable automatic gain control (AGC) in the preamble signal. Window fields are adjusted so that the lowest points of the second computation result Corr_im_im and the peak points of the third computation result Corr_re correspond to a center point of a window field.

Figure 8:
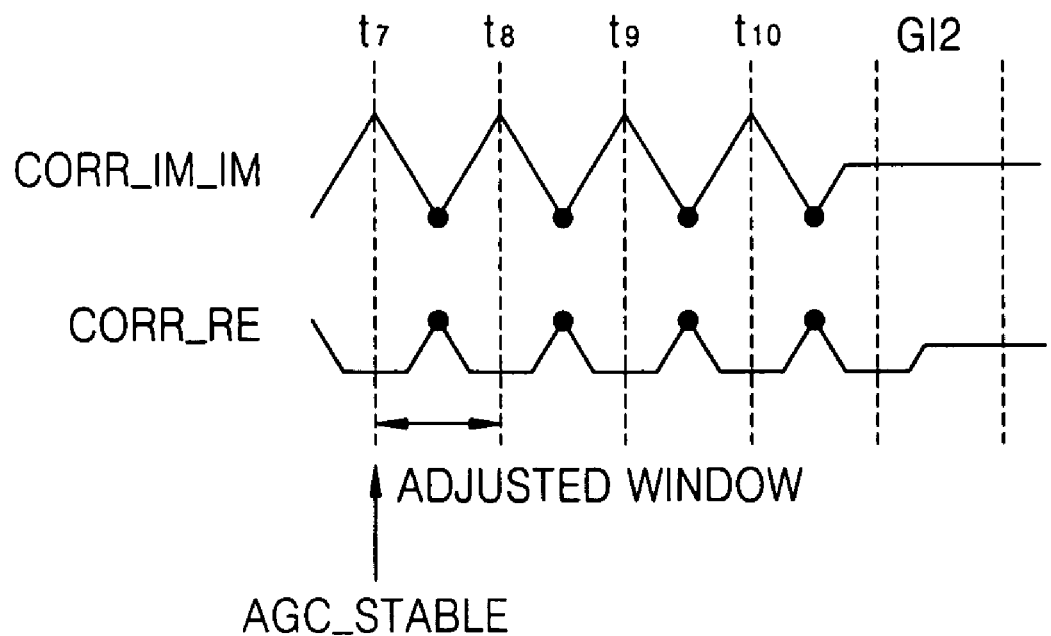
FIG. 8 illustrates an adjusted initial window field.

FIG. 8 illustrates an adjusted initial window field. Referring to FIG. 8, the initial window is adjusted and the peak points are continuously detected. If the number of peak points of the second computation result Corr_im_im that match the lowest points of the third computation result Corr_re is greater than a predetermined threshold value, it is determined that the OFDM signal is received. Alternatively, if the number of window fields where the lowest points of the second computation result _im _im correspond to the peak points of the third computation result Corr_re is greater than a predetermined number, it is determined that the OFDM signal is received. The peak points of the third computation result Corr_re or the lowest points of the second computation result Corr_im_im of a final window are used as a signal synchronization point to synchronize the OFMD signal.

A differential correlation matching method can stably detect and synchronize the OFDM signal even with a frequency offset or degradation from AWGN. A symbol timing synchronization can be quickly performed without additional hardware.

The peak points of the correlation computation result may be displaced to +1 or −1 samples due to multi-path fading in a multi-path environment.

Figure 9:
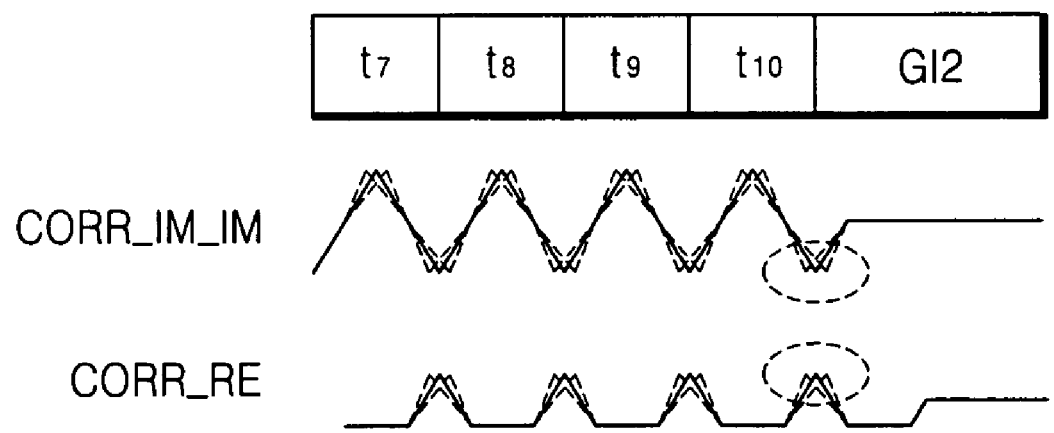
FIG. 9 illustrates displacements of peak points in a multipath environment.

FIG. 9 illustrates displacements of peak points in the multi-path environment. Referring to FIG. 9, the lowest points of the second computation result Corr_im_im do not correspond to the peak points of the third computation result Corr_re. The peak points and the lowest points are separated by a few samples due to the multi-path fading. In this case, the method of receiving the OFDM signal determines that the lowest points of the second computation result Corr_im_im correspond to the peak points of the third computation result Corr_re in a predetermined window field when the lowest points of the second computation result _im _im and the peak points of the third computation result are included with a 3 sample period in the predetermined window field. That is, the lowest points of the second computation result and the peak points of the third computation result can be displaced to +1 or −1 samples from a center point of the predetermined window field. In this case, if the number of window fields where the peak points and the lowest points included in a predetermined sample range is greater than a predetermined number, it is determined that the OFDM signal is detected.

In view of the OFDM signal synchronization, since a frequency domain equalizer can compensate for a change in a FFT window in the characteristics of the OFDM signal, a point before the predetermined sample can be determined as the OFDM signal synchronization point rather than the earliest point among the peak points of the third computation result Corr_re and the lowest points of the second computation result Corr_im_im.

A method of receiving an OFDM signal according can detect and synchronize the OFDM signal quickly and accurately even with a frequency offset or degradation from AWGN, thereby improving throughput in a high-speed wireless communication.

While this invention has been particularly shown and described with reference to an embodiment thereof, it will be understood by those skilled in the art that various changes in form and details may be made therein without departing from the spirit and scope of the invention as defined by the appended claims. Thus, the scope of the present invention is limited not by the foregoing but by the following claims, and all differences within the range of equivalents thereof should be interpreted as being within the scope of the present invention.

What is claimed is:

1. A method of receiving an orthogonal frequency division multiplexing (OFDM) signal using an OFDM signal receiver comprising:

receiving a plurality of sample signals from the OFDM signal;

providing a plurality of reference sample signals;

calculating a first value representing a first correlation between one of the sample signals and a different one of the sample signals;

calculating a second value representing a second correlation between one of the reference sample signals and a different one of the reference sample signals, the one of the reference sample signals and the different one of the reference sample signals corresponding to the one of the sample signals and the different one of the sample signals, respectively;
calculating a third value from the first value and the second value; and
detecting the OFDM signal in response to the third value;
wherein:
the OFDM signal receiver comprises a computation unit and a controller;
receiving a plurality of sample signals, providing a plurality of reference sample signals and calculating the first value, the second value and the third value are performed by the computation unit; and
detecting the OFDM signal is performed by the controller.

2. The method of claim 1, wherein calculating the third value further comprises:
calculating a fourth value by multiplying a real component of the first value by a real component of the second value;
calculating a fifth value by multiplying an imaginary component of the first value by an imaginary component of the second value; and
calculating the third value by summing the fourth value and the fifth value.

3. The method of claim 2, wherein detecting the OFDM signal further comprises detecting the OFDM signal in response to the third value and the fifth value.

4. The method of claim 1, wherein calculating the third value further comprises:
calculating a fourth value by multiplying the first value and the second value; and
calculating the third value by calculating a real component of the fourth value.

5. A method of claim 1 further comprising:
repeating the calculation of the first and second values for a set of the sample signals to generate a plurality of first values and a plurality of second values;
wherein calculating the third value further comprises:
calculating a plurality of fourth values from the plurality of first values and the plurality of second values; and
summing the plurality of fourth values to generate the third value; and
repeating the calculation of the third value for each of the plurality of sample signals to generate a plurality of third values;
wherein detecting the OFDM signal further comprises detecting the OFDM signal in response to the plurality of third values.

6. The method of claim 5, wherein detecting the OFDM signal further comprises:
comparing a number of peak points of the plurality of third values to a threshold value.

7. The method of claim 5, wherein:
calculating the plurality of first values further comprises multiplying the sample signal by a complex conjugate of a previous sample signal; and
calculating the plurality of second values further comprises multiplying the reference sample signal by a complex conjugate of a previous reference sample signal.

8. The method of claim 5, further comprising:
synchronizing the OFDM signal substantially at a point where a correlation between a plurality of reference sample signals and the sample signals is substantially reduced.

9. The method of claim 5, further comprising:
synchronizing the OFDM signal in response to a plurality of peak points of a plurality of real components of the plurality of third values.

10. The method of claim 9, wherein synchronizing the OFDM signal further comprises determining a final peak point of the plurality of peak points as a signal synchronization point.

11. The method of claim 5, further comprising:
establishing at least one window field in the plurality of third values beginning at a point where an automatic gain control (AGC) becomes substantially stable;
adjusting the at least one window field to make at least one peak point of the plurality of third values substantially correspond to at least one center point of one of the at least one window field; and
determining a final peak point of the at least one real first result in one of the at least one window field as a signal synchronization point.

12. The method of claim 11, wherein adjusting the at least one window field further comprises:
determining that one of the at least one peak point substantially corresponds to one of the at least one center point of a window field if the peak point is within −1 to 1 samples, inclusive, of the center point.

13. The method of claim 5, wherein detecting the OFDM signal further comprises:
establishing at least one window field in the plurality of third values beginning at a point where an automatic gain control (AGC) becomes substantially stable;
adjusting the at least one window field to make at least one peak point of the plurality of third values substantially correspond to at least one center point of one of the at least one window field; and
determining a point before an earliest peak point of the plurality of third values as a signal synchronization point.

14. A method of receiving an orthogonal frequency division multiplexing (OFDM) signal using an OFDM signal receiver comprising:
receiving a plurality of sample signals from the OFDM signal;
providing a plurality of reference sample signals;
calculating a sample signal result for each sample signal by:
calculating a first correlation value representing a first correlation between the sample signal and a different one of the sample signals;
calculating a second correlation value representing a second correlation between a reference sample signal and a different one of the reference sample signals, the reference sample signal and the different one of the reference sample signals corresponding to the sample signal and the different one of the sample signal, respectively; and
multiplying the first correlation value and the second correlation value to generate the sample signal result;
calculating at least one result by:
selecting a set of sample signal results for each result; and
summing the sample signals results of the set; and
detecting and synchronizing the OFDM signal in response to the at least one result;
wherein:
the OFDM signal receiver comprises a computation unit and a controller;

receiving a plurality of sample signals, providing a plurality of reference sample signals, calculating a sample signal result and at least one result are performed by the computation unit; and detecting and synchronizing the OFDM signal are performed by the controller.

15. The method of claim 14, wherein the result is calculated by $$\sum_{k=0}^{k=m-1} x_k x_{k-1}^* r_k r_{k-1}^*$$

wherein, $X_k$ is a $k^{th}$ sample signal, $x^*_{k-1}$ is a complex conjugate of a k-$1^{th}$ sample signal, $r_k$ is a $k^{th}$ reference sample signal, $r^*_{k-1}$ is a complex conjugate of a k-$1^{th}$ reference sample signal, and m is a number of samples in a symbol of the OFDM signal.

16. The method of claim 15, further comprising:
calculating at least one real result by calculating a real component of the at least one result; and
detecting the OFDM signal through a peak point of the at least one real result.

17. The method of claim 16, further comprising:
calculating the sample signal result for each sample signal further comprising multiplying an imaginary component of the first correlation value by an imaginary component of the second correlation value to generate a second sample signal result;
calculating at least one second result by:
selecting a set of second sample signal results for each second result; and
summing the second sample signals results of the set; and
detecting and synchronizing the OFDM signal further comprising detecting the OFDM signal when a number of peak points of at least one real result corresponding to low points of the at least one second result is greater than a threshold value.

18. The method of claim 17, wherein detecting and synchronizing the OFDM signal further comprises detecting and synchronizing at a point where the peak points of the at least one real result and the low points of the at least one second result disappear.

19. The method of claim 17, wherein detecting and synchronizing the OFDM signal further comprises determining a final peak point of the at least one real result as a signal synchronization point.

20. The method of claim 16, further comprising:
establishing at least one window field in the at least one real result beginning at a point where an automatic gain control (AGC) becomes substantially stable;
adjusting the at least one window field to make at least one peak point of the at least one real result substantially correspond to at least one center point of one of the at least one window field; and
determining a final peak point of the at least one real result in one of the at least one window field as a signal synchronization point.

21. The method of claim 20, wherein adjusting the at least one window field further comprises:
determining that one of the at least one peak point substantially corresponds to one of the at least one center point of a window field if the peak point is within -1 to 1 samples, inclusive, of the center point.

22. The method of claim 16, wherein detecting and synchronizing the OFDM signal further comprises:
establishing at least one window field in the at least one real result beginning at a point where an automatic gain control (AGC) becomes substantially stable;
adjusting the at least one window field to make at least one peak point of the at least one real result substantially correspond to at least one center point of one of the at least one window field; and
determining a point before an earliest peak point of the at least one real result as a signal synchronization point.

23. A method of receiving an orthogonal frequency division multiplexing (OFDM) signal using an OFDM signal receiver comprising:
receiving a plurality of sample signals;
delaying the plurality of sample signals;
multiplying each sample signal by a complex conjugate of one of the delayed sample signals to generate a plurality of first products;
providing a plurality of reference sample signals and a plurality of delayed reference sample signals;
multiplying each reference sample signal by a complex conjugate of one of the delayed reference sample signals to generate a plurality of second products;
multiplying a real component of each of the first products by a real component of each of the second products to generate a plurality of real products;
multiplying an imaginary component of each of the first products by an imaginary component of each of the second products to generate a plurality of imaginary products;
summing the plurality of real products in a first result;
summing the plurality of imaginary products in a second result;
summing the first result and the second result in a third result; and
detecting the OFDM signal in response to the second result and the third result;
wherein:
the OFDM signal receiver comprises a computation unit and a controller;
receiving a plurality of sample signals, delaying the plurality of sample signals, multiplying each sample signal, providing a plurality of reference sample signals and a plurality of delayed reference sample signals. multiplying each reference sample signal, multiplying a real component of each of the first products, multiplying an imaginary component of each of the first products. summing the plurality of real products, summing the plurality of imaginary products and summing the first result and the second result are performed by the computation unit; and
detecting the OFDM signal is performed by the controller.

* * * * *

UNITED STATES PATENT AND TRADEMARK OFFICE
CERTIFICATE OF CORRECTION

PATENT NO. : 7,602,854 B2
APPLICATION NO. : 11/335956
DATED : October 13, 2009
INVENTOR(S) : Seung-Kwon Baek It is certified that error appears in the above-identified patent and that said Letters Patent is hereby corrected as shown below:

Column 4, line 11, the word " $x_{k-1}=r_{k-1}e^{j\Delta\theta}$ " should read -- $x_{k-1}=r_{k-1}e^{j\Delta\omega k}e^{j\Delta\theta}$ --;

Column 4, Equation 4 line 15 should read -- $\sum_{k=0}^{k=m-1} r_k e^{j\Delta\omega k} r*_{k-1} e^{-j\Delta\omega k} e^{-j\Delta\theta} r_k r*_{k-1}$ --;

Column 5, line 20, the word "Cor_re_re" should read -- Corr_re_re --;

Column 5, line 21, the word "_im_im" should read -- Corr_im_im --;

Column 5, line 40, the word "_im_im" should read -- Corr_im_im --;

Column 5, line 61, the word "_im_im" should read -- Corr_im_im --;

Column 6, line 19, the word "_im_im" should read -- Corr_im_im --;

Column 9, line 18, claim 15 the word "$X_k$" should read -- $x_k$ --;

Column 9, line 19, claim 15 the word "$r_k$is" should read -- $r_k$ is --;

Column 10, lines 52-53, claim 23 the word "signals." should read -- signals, --;

Column 10, line 56, claim 23 the word "products." should read -- products, --.

Signed and Sealed this

Sixteenth Day of March, 2010

David J. Kappos
*Director of the United States Patent and Trademark Office*